(12) United States Patent
He et al.

(10) Patent No.: US 9,648,300 B2
(45) Date of Patent: May 9, 2017

(54) CALIBRATION OF MULTI-CAMERA DEVICES USING REFLECTIONS THEREOF

(71) Applicant: Leap Motion, Inc., San Francisco, CA (US)

(72) Inventors: Hongyuan (Jimmy) He, San Francisco, CA (US); David S. Holz, San Francisco, CA (US)

(73) Assignee: Leap Motion, Inc., San Francisco, CA (US)

( * ) Notice: Subject to any disclaimer, the term of this patent is extended or adjusted under 35 U.S.C. 154(b) by 209 days.

(21) Appl. No.: 14/286,165

(22) Filed: May 23, 2014

(65) Prior Publication Data
US 2015/0341618 A1 Nov. 26, 2015

(51) Int. Cl.
*H04N 13/02* (2006.01)
*G06T 7/00* (2017.01)

(52) U.S. Cl.
CPC ......... *H04N 13/0246* (2013.01); *G06T 7/002* (2013.01); *H04N 13/02* (2013.01)

(58) Field of Classification Search
CPC ..... H04N 13/0246; H04N 13/02; G06T 7/002
See application file for complete search history.

(56) References Cited

U.S. PATENT DOCUMENTS

2013/0169822 A1* 7/2013 Zhu .................. G06T 7/0018
348/180

* cited by examiner

*Primary Examiner* — Dave Czekaj
*Assistant Examiner* — Nam Pham
(74) *Attorney, Agent, or Firm* — Haynes Beffel & Wolfeld LLP; Ernest J. Beffel, Jr.

(57) ABSTRACT

The technology disclosed can provide capabilities such as calibrating an imaging device based on images taken by device cameras of reflections of the device itself. Implementations exploit device components that are easily recognizable in the images, such as one or more light-emitting devices (LEDs) or other light sources to eliminate the need for specialized calibration hardware and can be accomplished, instead, with hardware readily available to a user of the device—the device itself and a reflecting surface, such as a computer screen. The user may hold the device near the screen under varying orientations and capture a series of images of the reflection with the device's cameras. These images are analyzed to determine camera parameters based on the known positions of the light sources. If the positions of the light sources themselves are subject to errors requiring calibration, they may be solved for as unknowns in the analysis.

20 Claims, 13 Drawing Sheets

CALIBRATION OF MULTI-CAMERA DEVICES USING REFLECTIONS THEREOF

TECHNICAL FIELD

The technology disclosed relates to calibrating depth-sensing capable imaging devices including multiple cameras and in particular to re-calibration of imaging devices in environments readily accessible to users.

BACKGROUND

The subject matter discussed in this section should not be assumed to be prior art merely as a result of its mentioned in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Various imaging devices with depth-sensing capabilities include two (or more) cameras and, optionally, one or more light sources to illuminate a scene and thereby enhance contrast between foreground and background objects. The relative positions and orientations of the two cameras and of the lens and image sensor within each camera, as well as the shapes of the two lenses, are generally fixed by design in accordance with specified parameters. Knowledge of these parameters facilitates, at least in principle, determinations of the spatial position (including depth) of objects within the fields of view of both cameras from two images simultaneously taken therewith.

However, due to the inherent variability of any manufacturing process, the actual parameters usually deviate slightly from the nominal design parameters and vary from device to device, limiting the accuracy and/or precision of the determinations. To improve accuracy and precision, each individual motion-capture device is, therefore, typically calibrated following manufacture to determine the actual values of the design parameters; these may then be taken into consideration when computing positions and tracking motions based on images acquired by the cameras. Calibration may be performed at the manufacturing facility, and generally involves acquiring images of an object or pattern of known dimensions (e.g., a checker-board pattern of known unit size) with both cameras, and computing a set of parameters reflecting the deviation from expected parameter values—e.g., by minimizing a metric of the difference between the actual images and the theoretically expected images as derived from the known dimensions and the parameter values.

While the motion-capture device generally yields accurate positional determinations immediately upon calibration and for some time thereafter, the performance may deteriorate over time as the parameter values change as a consequence of, e.g., temperature fluctuations and/or mechanical forces to which the device may be subjected during use or transport. Consequently, there is a need for improved techniques affording re-calibration of the device by the end-user.

SUMMARY

The technology disclosed relates to conveniently calibrating an imaging device based on images, taken by the device cameras, of reflections of the device itself. Implementations exploit device components that are easily recognizable in the images, such as one or more light-emitting devices (LEDs) or other pointlike light sources. Advantageously, this approach dispenses with the need for specialized calibration hardware (such as an object carrying a carefully sized calibration pattern) and can be accomplished, instead, with hardware readily available to a user of the device—that is, the device itself and a reflecting surface, which may, e.g., be a computer screen. In some implementations, the user may simply hold the device up against the screen (or some other reflecting surface) under varying orientations and capture a series of images of the reflection with the cameras. These images may then be analyzed to determine the camera parameters based on the known positions of the light sources (or other recognizable components). Alternatively, if the positions of the light sources themselves are subject to errors requiring calibration, they may be solved for as unknowns in the analysis.

Accordingly, among other aspects, implementations of the technology disclosed provide a method of calibrating an imaging device. Imaging devices suitable for use with the method can comprise a plurality of cameras. One method implementation includes capturing reflection images of the imaging device with at least two cameras, analyzing the reflection images to locate at least one feature of the imaging device therein and an error thereof, using a current calibration parameter set, and determining an improved current calibration parameter set for the imaging device based at least in part upon location of the at least one feature of the imaging device.

Some imaging devices include one or more light sources. Capturing reflection images of the imaging device will capture reflection images of the one or more light sources that can be analyzed as features of the imaging device.

During analysis, a set of three-dimensional (3D) positions for the features of the imaging device captured in the reflection images is reconstructed by applying stereo matching techniques. Computing the error during analyzing can include finding a low value for a cost function indicative of a deviation of an expected location of the at least one feature from an observed location of the at least one feature.

Some imaging devices include three light sources positioned substantially along a straight line. Capturing reflection images of the imaging device will capture reflection images of the three light sources that can be analyzed as features of the imaging device.

During analysis, a set of 3D positions for the reflected light sources of the imaging device captured in the reflection images is reconstructed using the current calibration parameters by applying stereo matching techniques and computing the error from the 3D positions of the reflected light sources. Computing the error during analyzing can include determining an extent to which the 3D positions are coplanar. For example, determining an extent to which the 3D positions are coplanar can include computing the bisecting planes between an origin (actual) location of a light source and an expected location for the reflected light sources as reconstructed, computing a set of dot products, each of a combination of a normal corresponding to a bisecting plane and a bisecting point, wherein the plane and the point are between the origin location of a light source and the expected location for the reflected light source, and computing a variance of the set of all dot products. The variance is provided as the error. An improved current calibration parameter set can be determined by finding a calibration parameter set corresponding to a low value of the error.

Reflection images of an imaging device can be captured with the imaging device disposed in front of a reflective screen, such that the reflection images are captured from reflections of the device in the reflective screen. The reflection images can be captured at varying orientations of the imaging device relative to a reflecting surface.

Calibration parameters can include an intrinsic parameter corresponding to a physical arrangement of portions of the camera. Example intrinsic parameters include a distance between a lens and a sensor of at least one of the cameras, a translational displacement between a lens and a sensor of at least one of the cameras, a relative rotation between a lens and a sensor of at least one of the cameras, and a parameter describing a curvature of a lens of at least one of the cameras. Calibration parameters can include an extrinsic parameter corresponding to a physical arrangement of one or more cameras in the device. Example extrinsic parameters can include a distance between any two of the cameras, a translational displacement between any two of the cameras, a relative rotation between any two of the cameras, and a position of at least one light source of the imaging device.

Another implementation of the technology disclosed provides a method of determining calibration parameters for an imaging device. The imaging device can include three light sources positioned substantially along a straight line. During calibration, the device can be disposed before a reflective surface. One method implementation includes capturing reflection images of the imaging device and the three light sources of the device. A set of 3D positions for the three light sources of the imaging device captured in the reflection images is reconstructed using stereo matching. A set of bisecting planes, each between an origin (actual) location of one of the three light sources and an expected 3D position for the reflected light sources as reconstructed is computed. A set of dot products, each of a combination of a normal corresponding to a bisecting plane and a bisecting point, wherein the plane and the point are between the origin location of a light source and the expected location for the reflected light source, is computed. An error comprised of a variance of the set of all dot products is computed. A calibration parameter set corresponding to a value of the error that is less than a threshold is found.

A score for a user can be computed based at least in part upon a set of error values determined from a repetitive execution of calibration. The score for the user can be compared to a set of scores determined for a plurality of users, and an indication of success can be provided to the user based at least in part upon a favorable outcome of the comparison.

A further implementation of the technology disclosed provides a computer system for calibrating an imaging device. The imaging device includes a plurality of cameras. One system implementation includes an interface to receive images from at least two cameras, a memory to store the images and instructions for execution by a processor, and determine calibration parameters of the imaging device based on the at least one located feature. Some implementations also include a mirror or other reflective surface. For example, a mirror or other reflective surface can include a screen (e.g., monitor, computer screen, television screen, etc.) having a reflective surface.

Advantageously, various implementations hereof allow the user of an imaging device to quickly and conveniently calibrate the device. Some embodiments can provide calibration with substantially reduced overhead. Many embodiments can provide calibration without requiring any special technical expertise. Embodiments can enable re-calibrations as needed. Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1A:
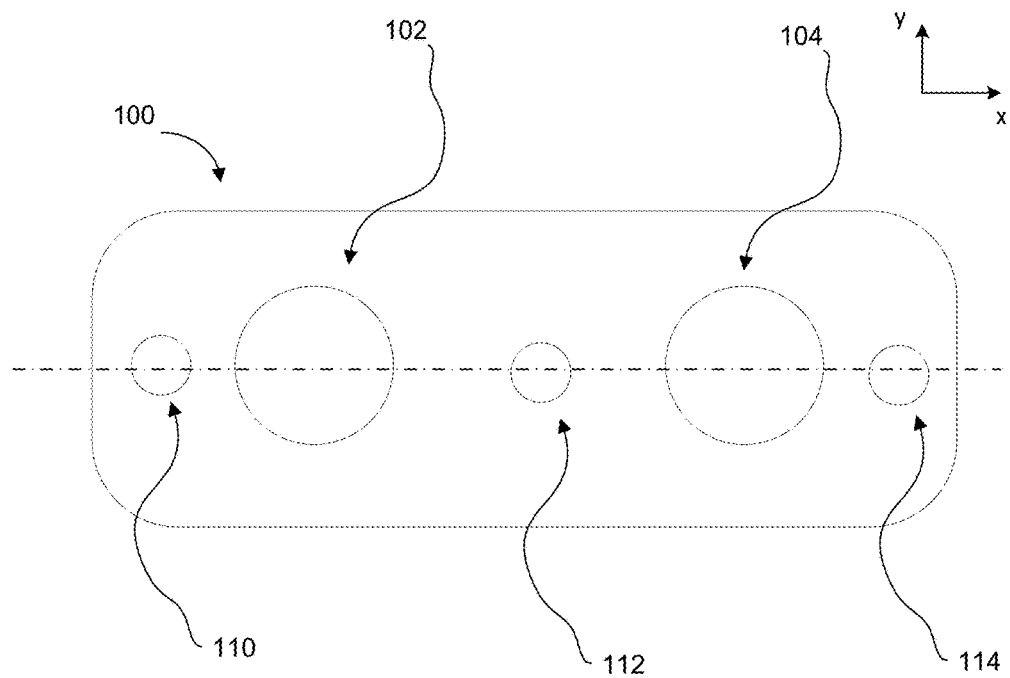
FIGS. 1A and 1B are top and side views, respectively, of an imaging device in accordance with various implementations.

The technology disclosed can provide capabilities such as calibrating an imaging device based on images taken by device cameras of reflections of the device itself. Implementations exploit device components that are easily recognizable in the images, such as one or more light-emitting devices (LEDs) or other light sources to eliminate the need for specialized calibration hardware and can be accomplished, instead, with hardware readily available to a user of the device—the device itself and a reflecting surface, such as a computer screen. The user may hold the device near the screen under varying orientations and capture a series of images of the reflection with the device's cameras. These images are analyzed to determine camera parameters based on the known positions of the light sources. If the positions of the light sources themselves are subject to errors requiring calibration, they may be solved for as unknowns in the analysis.

In embodiments, deviations in the relative positions and orientations of the various device components (including cameras and light sources) from the nominal values can be presumed to be fixed at least for the duration of the calibration procedure and to affect the images taken at different device orientations in the same or similar manner. As a result, it is possible to compute a full set of calibration parameters from the information contained in a sufficient number of images taken for different orientations. These computations can be carried out by, for example, a software application (executing, e.g., on a general-purpose computer or on the processor of the imaging device itself).

As used herein, a given signal, event or value is "based on" a predecessor signal, event or value of the predecessor signal, event or value influenced by the given signal, event or value. If there is an intervening processing element, step or time period, the given signal, event or value can still be "based on" the predecessor signal, event or value. If the intervening processing element or step combines more than one signal, event or value, the signal output of the processing element or step is considered "based on" each of the signal, event or value inputs. If the given signal, event or value is the same as the predecessor signal, event or value, this is merely a degenerate case in which the given signal, event or value is still considered to be "based on" the predecessor signal, event or value. "Responsiveness" or "dependency" of a given signal, event or value upon another signal, event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

Figure 1B:
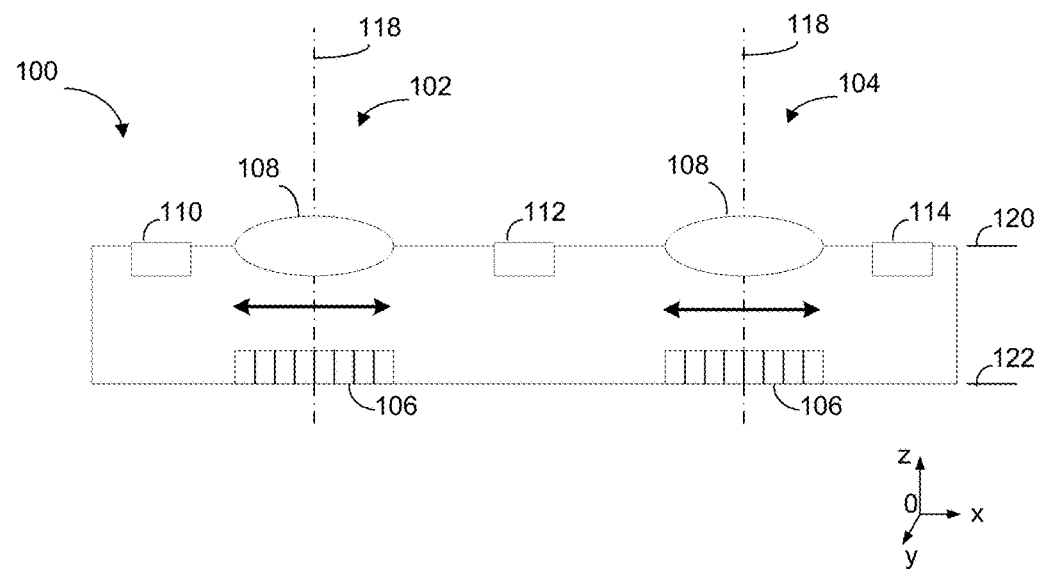

FIGS. 1A and 1B illustrate an example imaging device 100 implementation in top view and side view, respectively. The device 100 includes two cameras 102, 104, each having a rectangular, pixelated image sensor 106 (e.g., a CCD or CMOS sensor) and a lens 108 disposed there above, and three light sources 110, 112, 114, which may, e.g., be LEDs. Some implementations will include different numbers and/or arrangements of cameras and/or light sources. As shown, the light sources 110, 112, 114 may be centered along a straight line 116; this arrangement may be exploited for the determination of any lens aberrations (i.e., deviations from the ideal lens shapes), as explained further below. As designed, the lenses 108 are cylindrically symmetric around respective axes of rotation 118 and have a specified focal length. Their front and back surfaces may, ideally, be curved parabolically so as to map straight lines in the real world onto straight lines in respective images captured by the image sensors 106. For practical reasons (such as ease of manufacturing), however, the lens surfaces are typically designed to have constant curvature (i.e., to be portions of spherical surfaces); the resulting spherical aberrations in the images can be compensated for computationally. The lens 108 and sensor 106 within each camera 102, 104 are disposed in two parallel planes and centered about the same axis 118, that is, the normal to the two planes and symmetry axis of the lens 108. The distance between the lens 108 and sensor 106 is chosen, depending on the focal length of the lens 108 (which, in turn, depends on the radius of curvature), so as to yield a desired imaging ratio (i.e., size ratio between real-world objects and their images). In one implementation, the cameras 102, 104 are configured identically, e.g., cameras 102, 104 are oriented in the same direction, for definiteness hereinafter deemed to be the vertical direction (or z-direction). Further, they are vertically aligned with each other, such that their lenses 108 and sensors lie in respective common horizontal planes 120, 122, respectively. Horizontally, the cameras 102, 104 are spaced apart by a known distance in one dimension (the x-direction in FIGS. 1A and 1B), and aligned with each other in the other dimension (the y-direction). The light sources 110, 112, 114 are positioned at known locations relative to the cameras 102, 104, e.g., as shown, in the plane of the lenses 108 along a line connecting the centers of the lenses 108.

Figure 2A:
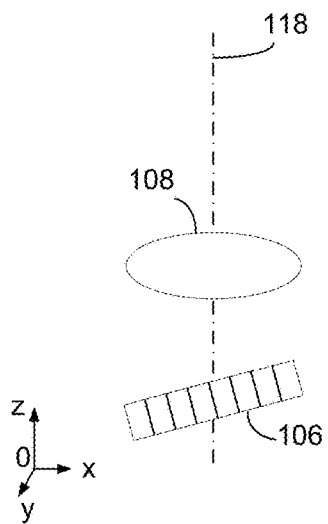
FIGS. 2A-2I illustrate deviations of various parameters of the imaging device of FIGS. 1A and 1B from the nominal values.
Figure 2B:
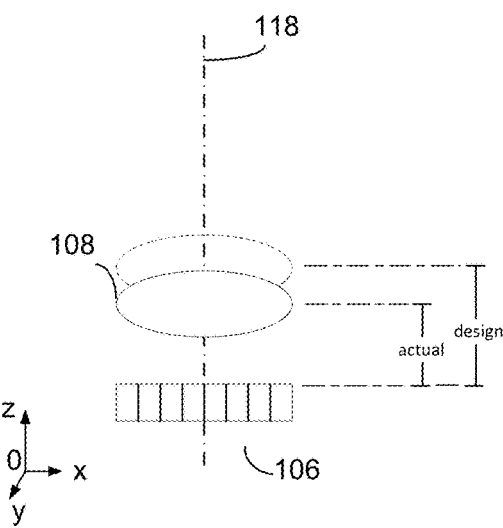
Figure 2C:
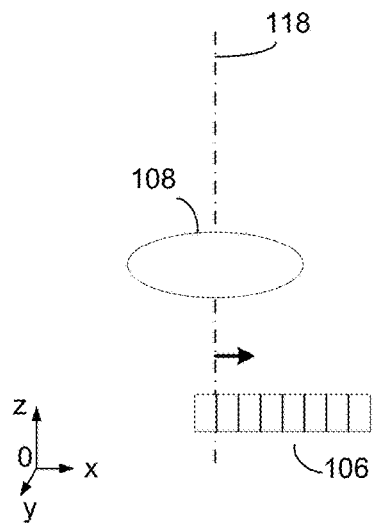

In practice, the alignment of the cameras 102, 104 with each other, the alignment between the sensor 106 and lens 108 within each camera, the curvature of the lenses 108, and the positions of the light sources 110, 112, 114 are not perfect, i.e., the actual device parameters generally deviate from the design parameters. For example, within a camera, the sensor 106 may be tilted in one or two dimensions relative to the lens 108, as shown in a side view in FIG. 2A. (Note that, for a cylindrically symmetric lens 108, an in-plane rotation between sensor 106 and lens 108 simply amounts to an overall rotation of the camera.) Further, the distance between sensor 106 and lens 108 may be smaller (as shown in FIG. 2B) or larger than designed, and/or the sensor 106 or lens 108 may be shifted in-plane, in one or two dimensions, relative to one another such that the sensor 106 and/or lens 108 is laterally "off-axis" (as shown in FIG. 2C).

In addition to potentially degrading the focusing properties of the lens, deviation of the curvature from the nominal curvature may change the focal length; a change in focal length can have the same effect as, and is for many purposes interchangeable with, a change in the lens-sensor distance.

Figure 2D:
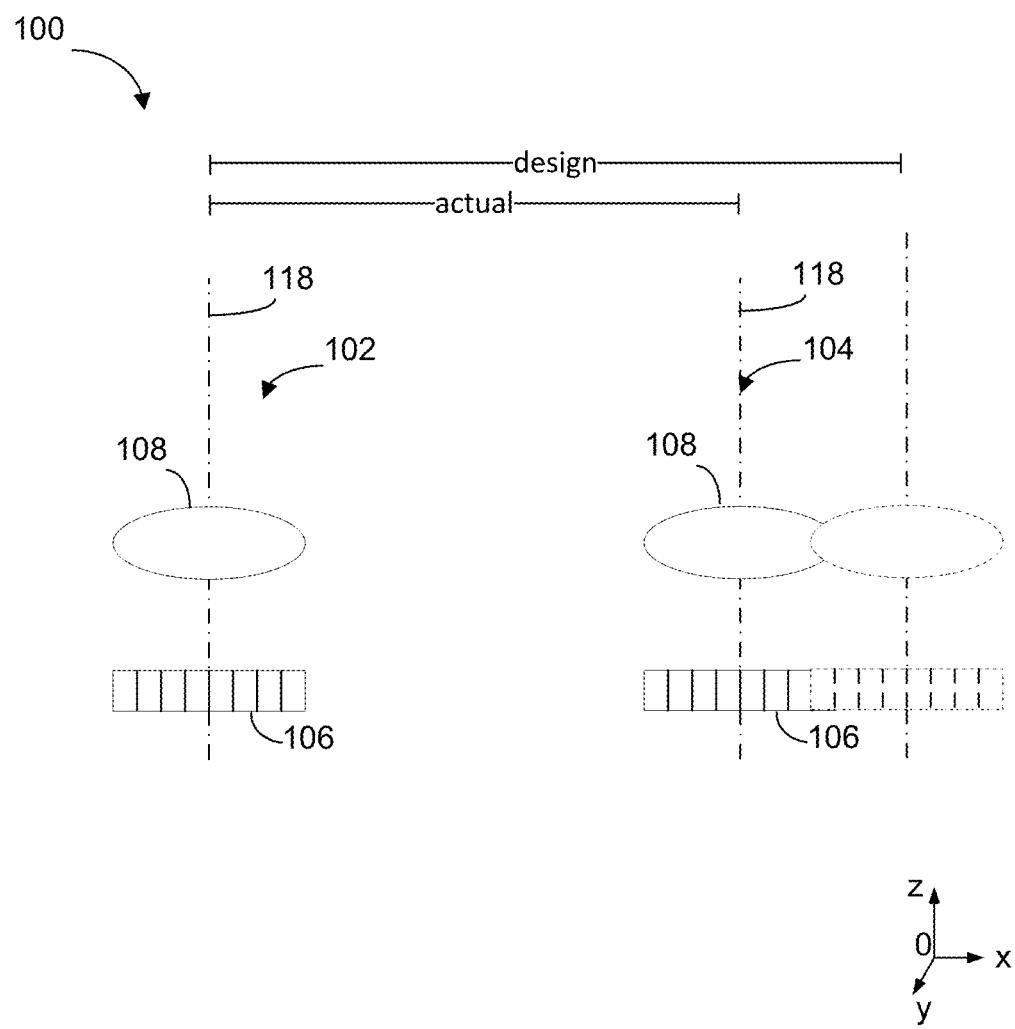
Figure 2E:
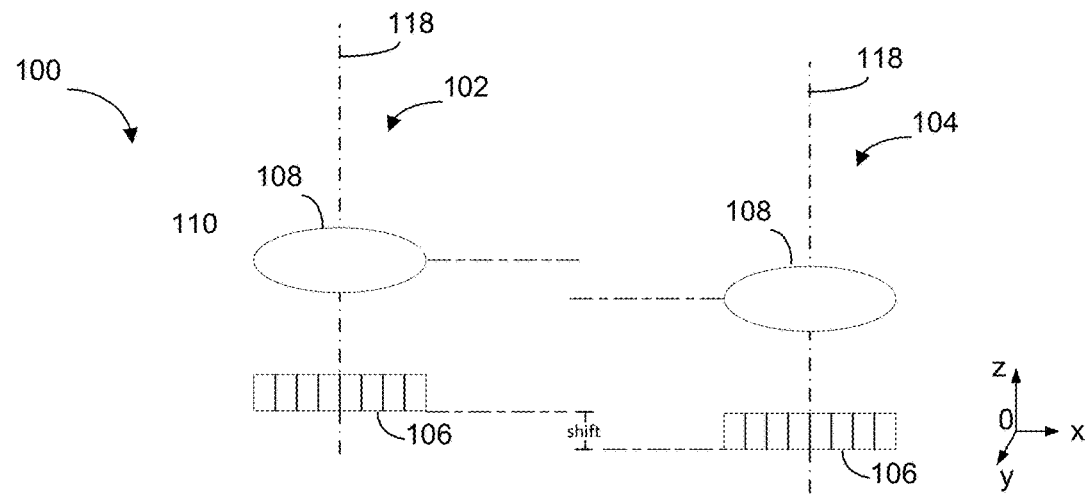
Figure 2F:
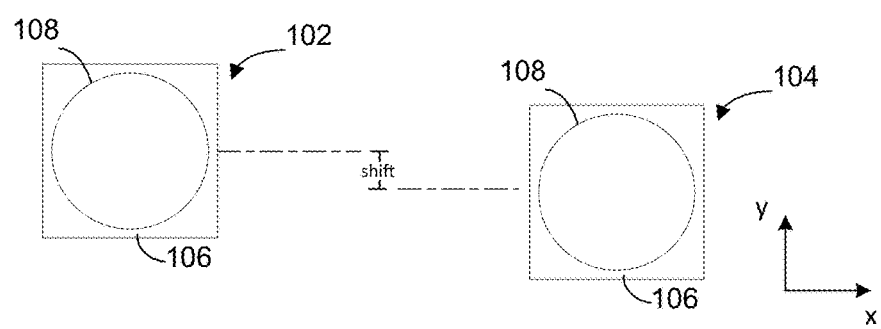
Figure 2G:
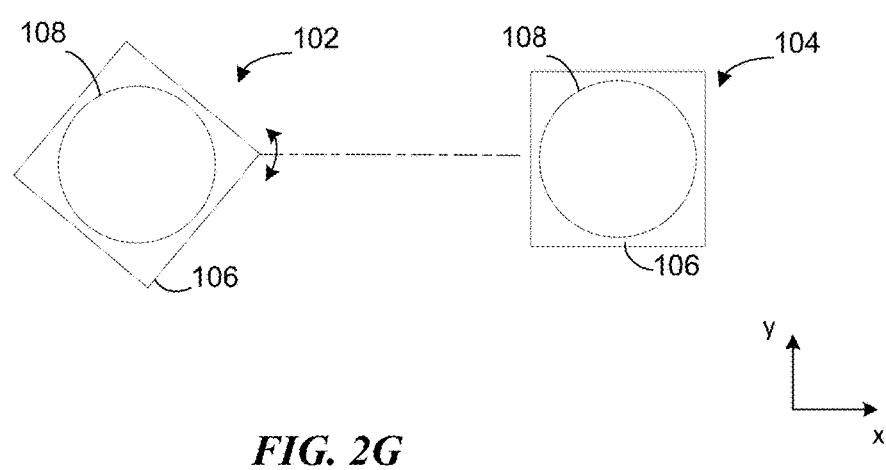
Figure 2H:
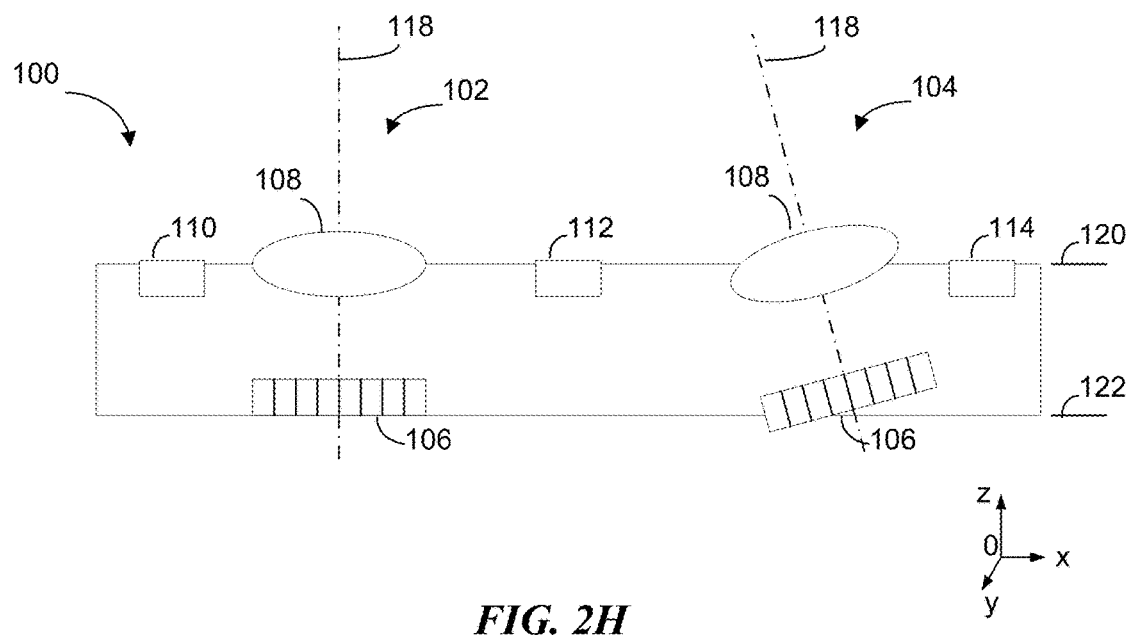
Figure 2I:
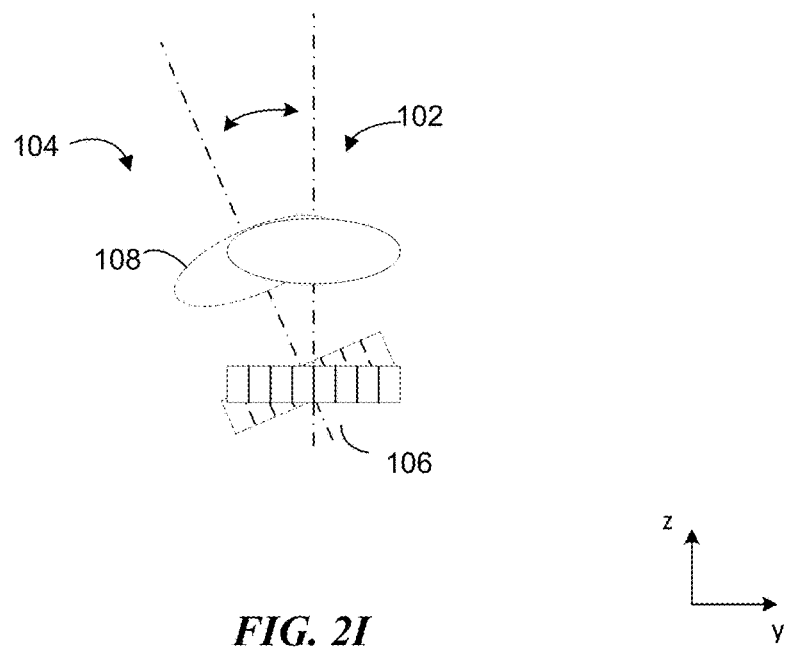

As between the two cameras 102, 104, their actual horizontal distance may differ from the nominal distance, as shown in FIG. 2D. In addition, the cameras 102, 104 may be shifted relative to one another vertically, as shown in FIG. 2E, and/or in-plane (i.e., in a direction perpendicular to the direction of separation between the cameras), as shown in a top view in FIG. 2F. Furthermore, the cameras 102, 104 may be rotated relative to one another in-plane (i.e., horizontally), e.g., via rotation of one of the sensors 106, as shown in FIG. 2G (top view), or tilted relative to one another along the direction of their separation (i.e., the x-direction), as shown in FIG. 2H, or perpendicularly thereto (i.e., in the y-direction), as shown in FIG. 2I. (Note that in the illustrated example, in-plane rotations of both cameras relative to the horizontal line connecting them by the same amount are equivalent to a horizontal displacement as shown in FIG. 2F in combination with a change in their horizontal distance as illustrated in FIG. 2D. Similarly, tilts of both cameras relative to their connecting line by the same amount are equivalent to a vertical displacement as shown in FIG. 2F in combination with a change in their horizontal distance. Rotations of both cameras perpendicular to the connecting line (i.e., in the y-z plane) amount simply to a rotations of the entire device 100.) Additionally, due to differences in the manufacturing process, parts tolerances, and the like, the three-dimensional placement of each light source in a device may deviate from the nominal position.

The deviations of the implemented imaging device 100 from the device as designed can be characterized by:

$$sm' = A[R|t]M' \qquad (3)$$

$$s\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} \qquad (4)$$

In which A is a camera matrix of a number of "intrinsic" parameters for each camera and [R|t] is a rotation-translation matrix including a number of "extrinsic" parameters capturing the relative positions and orientations between the cameras and the positions of the light sources relative to the cameras. (As will be readily understood by one of skill in the art, the intrinsic and extrinsic parameters may be the actual parameters of the device or the differences between the actual and the design parameters, or a combination of both.) Coordinates [X, Y, Z] indicate a 3D point in the world coordinate space. Coordinates [u, v] indicate a projection point in pixels. One camera intrinsic parameter $[c_x, c_y]$ indicates coordinates of a principal point such as an image center. Another camera intrinsic parameter [$f_x$, $f_y$] indicates focal lengths expressed in pixels. For example, the actual radial distortion of the lens 108 may be approximated by a polynomial, f(r), with a number of (e.g., between two and six) free parameters (see e.g., equations (1) and (2), where $k_1$, $k_2$, $k_3$, $k_4$, $k_5$, and $k_6$ are radial distortion coefficients and r is the Euclidian distance from the center of the lens to a point [x, y] on the lens).

$$f(r) = \frac{1 + k_1 r^2 + k_2 r^4 + k_3 r^6}{1 + k_4 r^2 + k_5 r^4 + k_6 r^6} \quad (1)$$

$$r^2 = x^2 + y^2 \quad (2)$$

In one implementation, the device 100 is described with seven intrinsic parameters per camera and twelve extrinsic parameters, i.e., 26 parameters in total. The seven intrinsic parameters include the lens-sensor separation (or, alternatively, the focal length of the lens), the horizontal translational displacements between the lens and sensor (in the x- and y-directions), the out-of plane angles of rotation (i.e., tilt) between the lens and sensor in two dimensions, and two parameters describing the curvature of the lens. The twelve extrinsic parameters include the three angles of rotation between the cameras 102, 104 and the three-dimensional positions (or displacements) of the three light sources 110, 112, 114. Any translational shifts between the two cameras 102, 104 are approximately captured by corresponding relative rotations.

In various implementations, imaging devices such as, e.g., the device 100 of FIGS. 1A and 1B are calibrated using reflections of the device 100—specifically, reflections of the light sources 110, 112, 114—as captured by the device cameras 102, 104. For that purpose, the device 100 is held or otherwise disposed in front of a reflective, preferably planar surface, such as a mirror or display screen. Typically, the reflectivity (and flatness) of an LCD screen is sufficient for calibrations in accordance herewith. Reflections are generally acquired for different orientations of the device 100 relative to the reflecting surface. Each individual camera can be calibrated based on an analysis of the reflection images it captures. For example, assuming that the light sources 110, 112, 114 are placed along a straight line, any deviation, in the images, of the positions of their reflections from a straight line indicates lens aberrations. The lens curvature can, in principle, be completely mapped out from a sufficient number of reflection images; for a polynomial approximation of the lens surface with only few (e.g., two) free parameters, a small number of images may suffice to accurately determine the parameter values. Rotations and translations between the lens and sensor can be inferred from the distances between the light source reflections in the images and the orientation of a line connecting them.

Figure 3A:
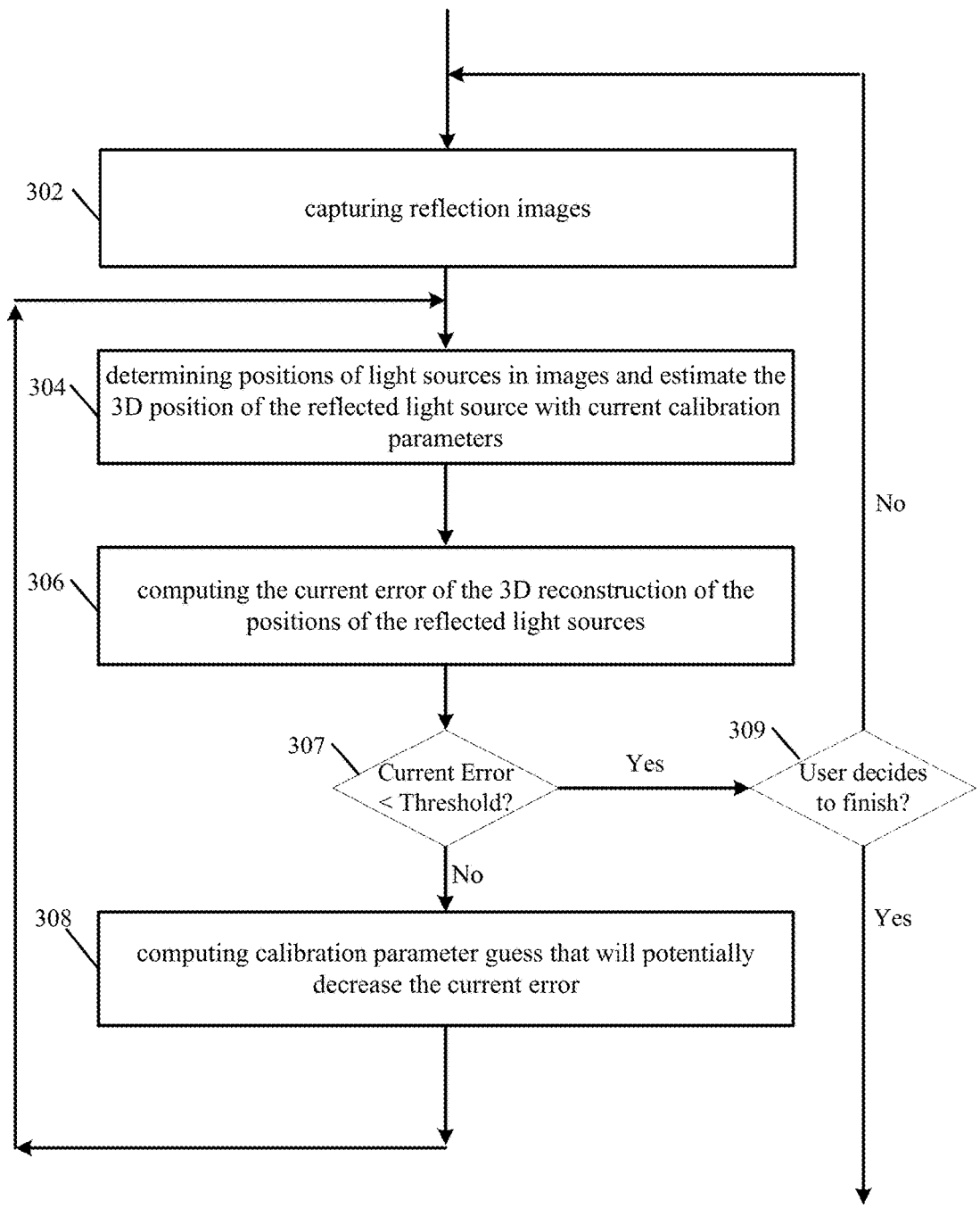
FIGS. 3A-3C show flowcharts of calibrating an imaging device in accordance with various implementations.

FIG. 3A shows a flowchart 300 of one implementation of calibrating an imaging device in accordance herewith. Flowchart 300 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIGS. 3A-3C. Multiple actions can be combined in some implementations. For convenience, this flowchart is described with reference to the system that carries out a method. The system is not necessarily part of the method.

With renewed reference to FIG. 3A, flowchart 300 illustrates determining (or estimating) the calibration parameters by reducing (or minimizing) a variance σ. In flowchart 300, calibration proceeds with the device being held or otherwise disposed in proximity with a reflective, preferably planar surface, such as a mirror or display screen. Device calibration can be performed with light source(s) of the device in the active (on) state. For example and with reference to FIG. 4, which illustrates a calibration operation in one implementation, in a block 402, user holds a device 100 being calibrated in front of a reflective planar surface—the screen of a display 410. (A non-planar reflective surface may, in principle, also be used as long as its curvature and configuration is known with sufficient accuracy and precision.) A set of images of the reflection can be captured with the device cameras 102, 104 (action 302). This process may be repeated additional times for various device orientations, as illustrated in block 404 of FIG. 4, in which the user has moved device 100 to a different position with respect to display 410. The user may rotate, move or rotate and move the device in front of the reflecting surface. The device 100 captures (action 302) image frames of its reflection (in this example in the reflective surface of display 410) at its regular frame rate, as shown in block 406 (i.e., images 416L, 416R from cameras 102, 104 captured at the time the device 100 is held at a position shown by block 402) and block 408 (i.e., images 418L, 418R from cameras 102, 104 captured at the time the device 100 is held at a position shown by block 404).

Figure 4:
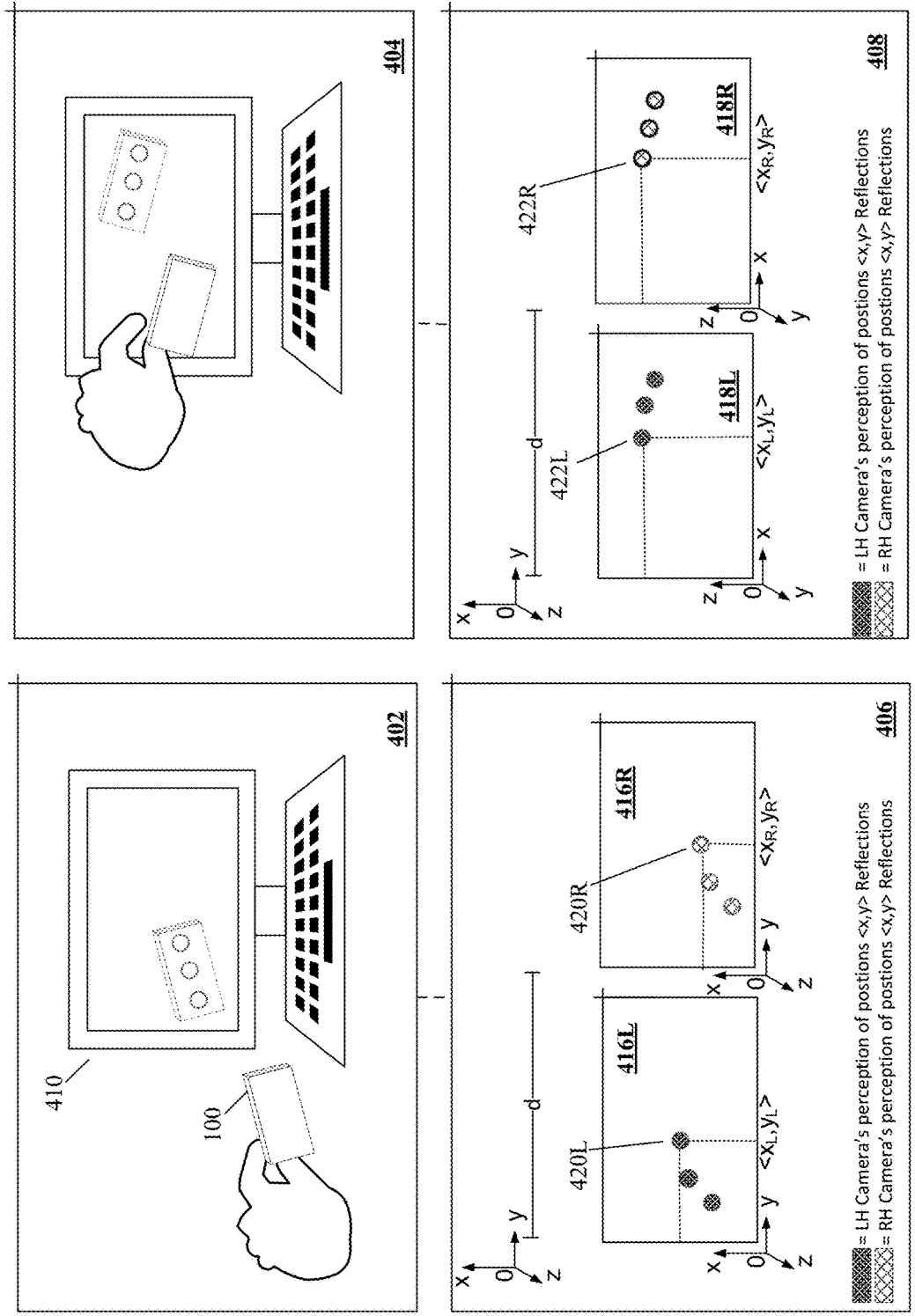
FIG. 4 illustrates a calibration operation in one implementation.

As shown by blocks 406, 408 of FIG. 4, the positions <$x_L$, $y_L$>, <$x_R$, $y_R$> of the light-source reflections 420L, 420R, 422L, 422R in the images 416L, 416R, 418L, 418R are determined (action 304). Light source reflections 420L, 420R, 422L, 422R can be located in the images using cluster recognition or similar techniques for identifying areas of high contrast. For example, a cluster can include a plurality of adjacent pixels having a relatively higher intensity than surrounding pixels. One way to find pixels of higher intensity is to scan the image until a pixel having an intensity value greater than a specific threshold is identified. Scanning continues until a corresponding pixel having a lower intensity relative to the high intensity values is identified. Pixels between these two identified pixels comprise the cluster for a particular row (or column) in the scan. A 3D position of the reflected light 510, 512, 514 (FIG. 5) can be determined from the positions of the light source reflections 420L, 420R, 422L, 422R identified using, for example, stereo-matching techniques. One implementation of stereo-matching includes projecting pairings of images back to a common image plane enabling the images to be compared on attributes such as features, intensity, or region. In other implementations, different or other stereo-matching techniques can be used. See, e.g., Hannah., "Digital Stereo Image Matching Techniques;" Wang et al., "A Region Based Stereo Matching Algorithm Using Cooperative Optimization." Displacements for relative features are determined to form a map of disparities between the images of the pairing. Depth information for the features is determined from the depth information. Positions <$x_L$, $y_L$>, <$x_R$, $y_R$> can be determined relative to the coordinate frames of the cameras.

An initial set of parameter values for the device (e.g., a prior calibration information, factory information, an estimate, an approximation, etc.), as well as an initial theoretical position and orientation of the reflecting surface relative to the device, is set (action 304). Theoretical positions are computed for the reflecting surface in order to find theoretical positions for the light-source reflections (e.g., using an optical ray-tracing method) (action 304). A comparison can be made for the computed theoretical positions for the light source reflections with the observed positions (action 306) in the images by the cameras.

Figure 3B:
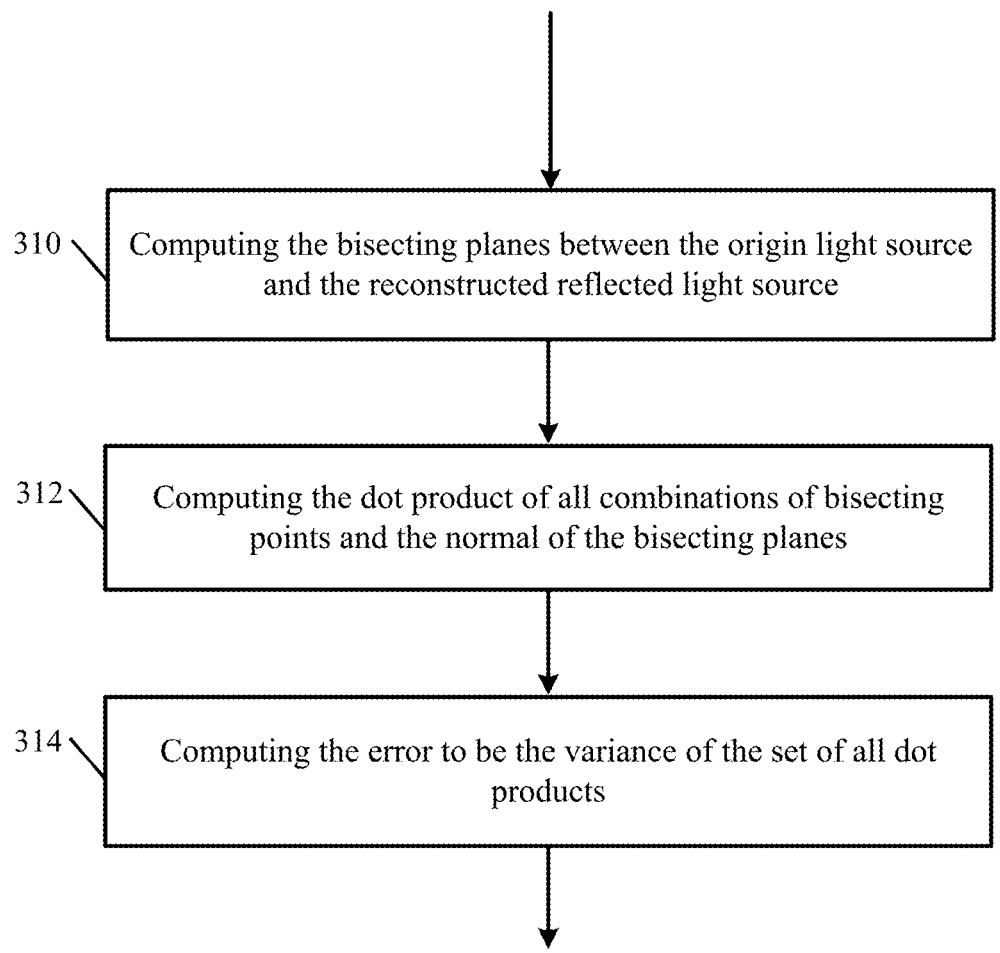

With reference to FIG. 3B, a flowchart 306 illustrates a method of computing the error of the current calibration parameters given the 3D reconstruction of the reflected light sources. Bisecting planes between the origin light sources and the 3D reconstruction of the reflected light sources are computed (action 310). A collection of dot products are computed for combinations of bisecting points and normal vectors of the bisecting planes in order to compare the bisecting planes to each other (action 312). This comparison is done by creating a new plane from each possible combination of bisecting points and normal vectors for the bisecting planes. Each new plane is then compared with one another to determine the extent to which they are coplanar. The closest perpendicular distance from each new plane to the center origin point is computed as the dot product between the normal of the new plane and the bisecting point. The error of the current calibration parameters is calculated as the variance of all dot product combinations (action 314).

Figure 5:
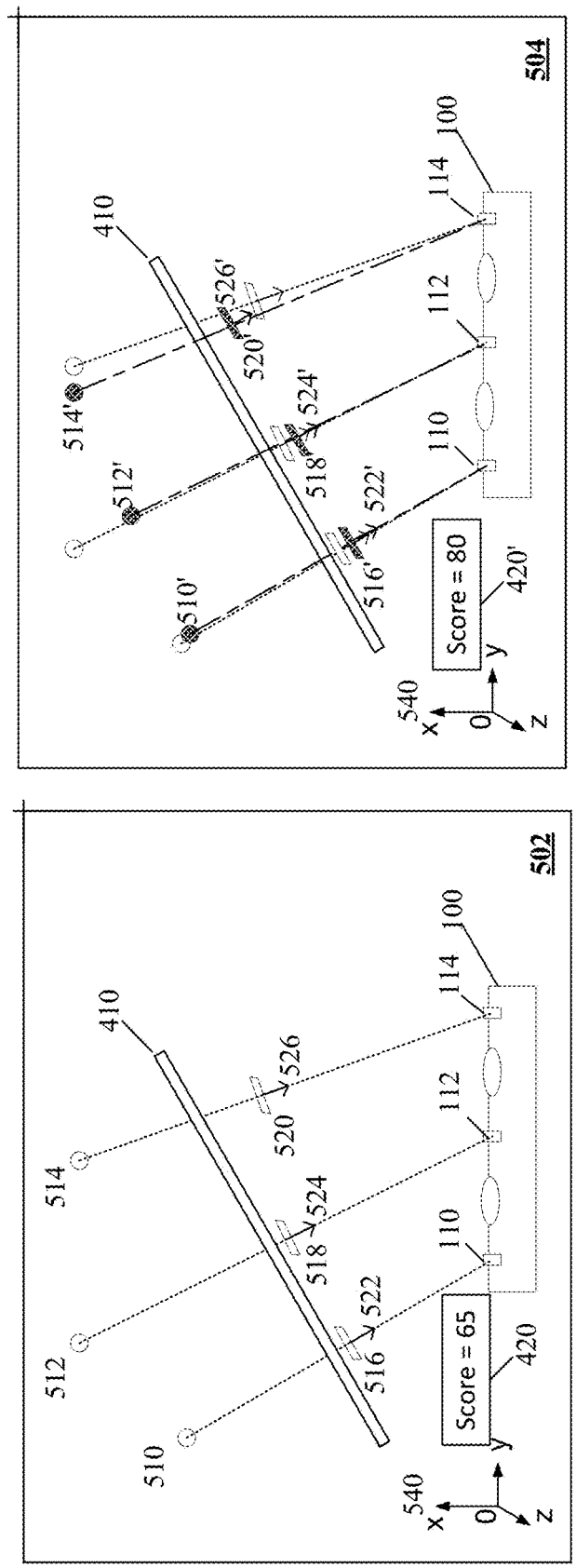
FIG. 5 illustrates determining variances from computed 3D positions of reflections of light sources in one implementation.

As described in actions 310-314 and as shown in block 502 of FIG. 5, the estimated 3D reconstruction of each reflected light source 510, 512, 514 based on the current calibration parameters is computed. The two points (actual light source 110, 112, 114 and reconstructed reflected point of the light source 510, 512, 514) describe a line. The bisecting plane for the line is represented by the bisecting line (half way point between 110 and 510 for example) and the normal vector which is computed as a normalized difference between the two endpoints. For example, normal vector 522 is determined from line 110-510 by representing the line 110-510 as a vector, and dividing that vector by the length of the line 110-510 to get the normal vector 522. The bisecting point is simply the halfway point on the line 110-510. The bisecting plane is determined from all points x in three dimensional space, such that the bisecting point b and the normal vector n follow the relation shown in equation (5):

$$(x-b) \text{dot } n = 0 \quad (5)$$

Given the reconstructed positions, perpendicular bisecting planes 516, 518, 520 and the corresponding normal vectors 522, 524, 526 can be calculated. Each plane is then compared with the normal vector of itself and all other planes to compute $K_{ij}$ as shown in equation (6).

$$K_{ij} = n_i \cdot P_j \quad (6)$$

Where $n_i$ is a plane normal vector and $P_j$ is a perpendicular bisecting plane. The error of the current calibration parameters is determined by calculating the variance σ, between each $K_{ij}$. As shown in block 502, a score 420 is determined for a set of calibration parameters based at least in part upon variance, σ. In block 502, the calibration information has yielded a score of 65. A calibration can be accepted or rejected based upon the score, among other criteria, by application of a threshold score, or other techniques. Again with reference to FIG. 5, in a block 504, a second calibration procedure is performed. A new estimated 3D reconstruction of each reflected light source 510', 512', 514' based on the now current (i.e., updated) calibration parameters is computed. A new set of perpendicular bisecting planes 516', 518', 520' and the corresponding normal vectors 522', 524', 526' can be calculated. Each plane can be compared with the normal vector of itself and all other planes to compute $K_{ij}$ as shown in equation (5). As is clearly depicted in FIG. 5, reconstructed light sources are more approximately coplanar, indicating a better quality of calibration parameters. Accordingly, variance, σ, and score 420'—a score of 80—reflect the improved quality of the set of calibration parameters in block 504 as compared with the set of calibration parameters in block 502.

Again with reference to FIG. 3A, a determination is made as to whether the error of the current calibration parameters is below a threshold value for the given reflected image (action 307). If the error is above the threshold, a new set of calibration parameters that will potentially lower the error, are estimated using numerical methods, such as the Nelder-Mead, Gradient Descent, Quasi-Newton, and other methods readily available to those skilled in the art (action 308). If the error is below the threshold and the user decides to continue the calibration procedure (decision 309), the device 100 can be moved to a different position and the actions 302-309 can be repeated using additional images (e.g., 418L, 418R).

For an imaging device with three light sources, each frame (i.e., pair of images) yields twelve measurements: the two-dimensional coordinates of each light source within both images. Three of these measurements are needed to fix the three degrees of freedom of the reflective surface (i.e., the two out-of-plane rotational degrees of freedom and one out-of-plane translational degree of freedom), leaving nine measurements per frame for determining the calibration parameters. Thus, three frames provide enough information to determine the 26 parameters of the imaging device. Typically, however, a much larger number of frames is acquired to improve measurement statistics and, as a consequence, the accuracy of the parameter optimization. In some implementations, the image analysis and optimization are carried out in parallel with the image acquisition and used to continuously refine the parameter values. In other implementations, the optimization does not begin until image capture has been completed, and operates simultaneously on all image data.

As a person of skill in the art will appreciate, the calibration approach described herein can readily be modified and adjusted to different imaging devices and different calibration parameters. For example, the imaging device may have fewer or more than three light sources. A larger number of light sources may be used for redundancy to increase calibration accuracy. With fewer light sources, the decreased information per frame can be compensated for by capturing more frames. Two light sources, for instance, yield eight measurements per frame (five of which are available for calibration), allowing 23 device parameters (including now only six unknown parameters of the light-source locations) to be determined from five frames. Even with a single light source, the device can be calibrated using the methods hereof based on twenty captured frames (each yielding four measurements, one of which can be used for calibration). Of course, depending on the errors introduced during manufacture and/or use of the imaging device as well as depending on the application context, the calibration may be performed for different numbers of parameters. For example, six (rather than three) extrinsic parameters may be used to fully capture the relative translation and rotation between the two cameras, and/or the lens surfaces may be described with a polynomial having more than two free parameters; both situations contribute to an increase in the number of device parameters. On the other hand, the locations of the light sources may be known with sufficient accuracy to obviate the need to include them as unknown parameters in the calibration. Furthermore, the light sources need not necessarily be active light sources, but may alternatively be diffuse reflectors of sufficient brightness to be visible in the reflection images. In fact, any features of the imaging device that can be reliably discerned and located in the reflection images may be used.

Figure 3C:
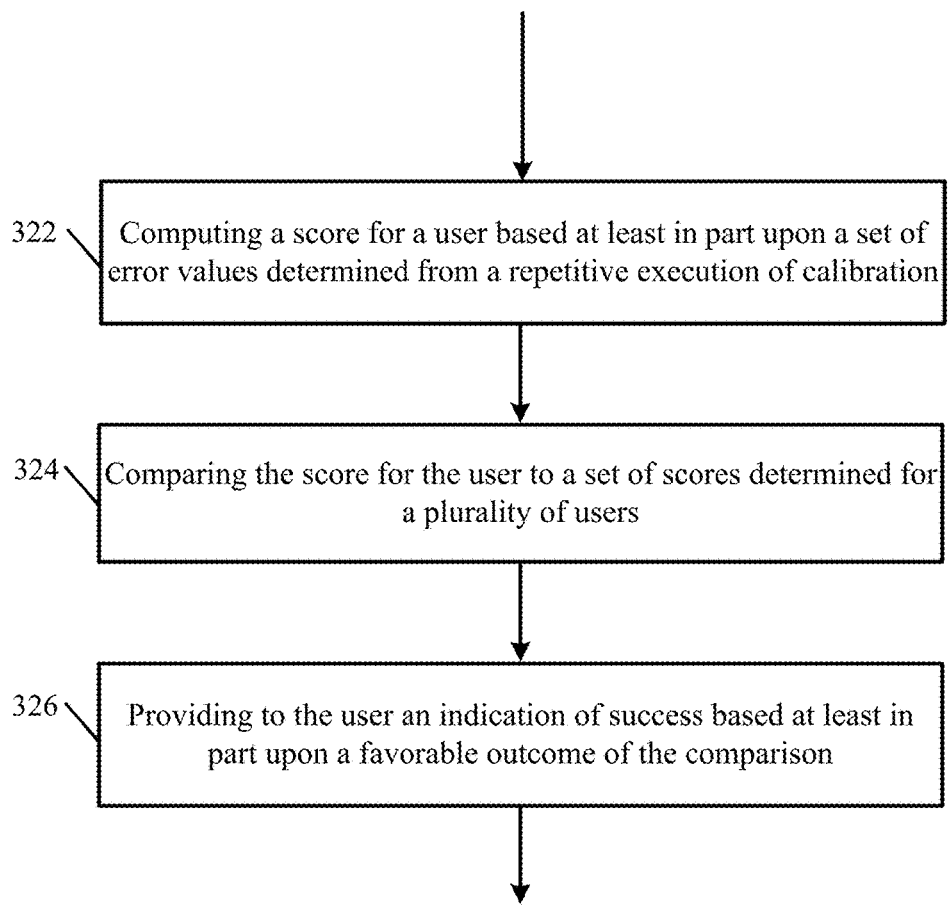

Now with reference to FIG. 3C, a flowchart 320 illustrates a method of applying gamification techniques to the calibration activity. A score for a user is computed based at least in part upon a set of error values determined from a repetitive execution of calibration (action 322). In one implementation, the score is calculated on a scale from, e.g. 0-100, as shown in equation (7):

$$S = \frac{100}{1+A\cdot\sigma} \tag{7}$$

Where S represents the user's current score, σ is the current variance error, and A represents a scaling factor on the error. The scaling factor A can be selected empirically based upon a criteria, such as for example setting A to choose a desired calibration accuracy level (or confidence level). The score for the user is compared to a set of scores determined for a plurality of users (action 324). In one implementation, a set of high scores are stored locally on the device 100 of FIG. 6 for which the calibration activity is being performed. In another implementation, a set of high scores are stored on a memory 604 of FIG. 6 of a host computer at which the calibration activity is being performed. In a yet further implementation, a set of high scores is stored on a networked server (not shown in FIG. 6 for clarity sake) and can be accessed globally for comparison among two or more users. An indication of success is provided to the user based at least in part upon a favorable outcome of the comparison (action 326). In one implementation, a status bar is displayed showing a user's progress through the calibration activity. This status bar becomes full as the user's calibration score approaches an acceptable score. The user is prompted to exit calibration once the score achieved is above a certain threshold, or the user can choose to continue calibrating and try to reach a new high score. Upon achieving a new high score, the user may be prompted to register the score wherever it is stored.

Figure 6:
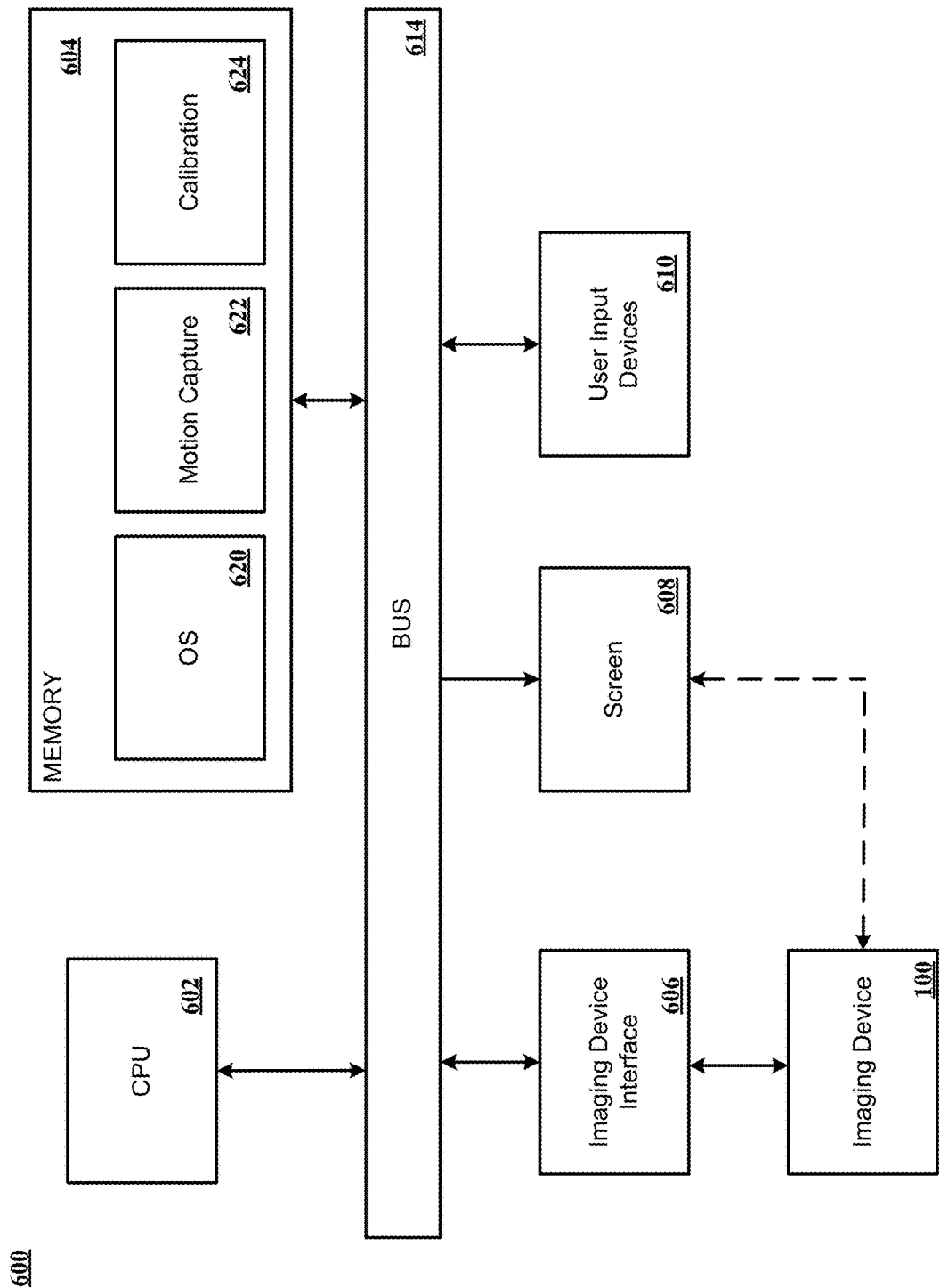
FIG. 6 is a block diagram illustrating a calibration system in accordance with various implementations.

FIG. 6 shows, in a simplified block diagram, an exemplary calibration system in accordance herewith. The system may be or include a computer 600, such as a suitably programmed general-purpose computer, including: a processor 602 (e.g., a general-purpose microprocessor, but depending on implementation can alternatively be a microcontroller, peripheral integrated circuit element, a CSIC (customer-specific integrated circuit), an ASIC (application-specific integrated circuit), a logic circuit, a digital-signal processor a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed) and associated memory 604 (e.g., RAM, ROM, and/or flash memory); a device interface 606 for connecting to the imaging device 100 and reading out data from the two (or more) cameras as well as controlling the operation of the cameras and light sources; a screen 608; optionally, user input devices 610 such as a keyboard and mouse; optionally, additional removable/non-removable computer storage media 612; and one or more buses 614 facilitating communication between these components. The imaging device 100 may generally be used, for example, to capture motions of the user or the user's hand for the purpose of enabling motion- and gesture-based control input. The screen 608 may be used as a reflective surface for the calibration procedure; advantageously, this eliminates the need for specialized calibration equipment. In some implementations, however, a mirror or other highly reflective surface is used instead, e.g., to improve the image quality of the reflection images. The memory 604 may store instructions to be executed by, and controlling the operations of, processor 602, as well as input and/or output data associated with execution of the instructions (e.g., the images received from the imaging device 100). These instructions, illustrated as a group of modules, may include an operating system 620 that directs the execution of low-level, basic system functions (such as memory allocation, file management, and operation of mass storage devices); a motion-capture module 622 for analyzing and interpreting image data from the cameras during normal operation; and a calibration module 624 for implementing the methods described herein, i.e., for identifying reflections of the light sources (or other discernible features) in the reflection images and optimizing the calibration parameters so as to minimize the deviation of computed theoretical locations of the light-source reflections from the locations measured in the images. Motion-capture techniques are described in detail in, e.g., U.S. Ser. No. 61/587,554, Ser. No. 13/414,485, 61/724,091, and Ser. No. 13/724,357 filed on Jan. 17, 2012, Mar. 7, 2012, Nov. 8, 2012, and Dec. 21, 2012 respectively, the entire disclosures of which are hereby incorporated by reference. In general, the instructions may be implemented in any programming language, including, for example, C, C++, JAVA, Fortran, Basic, Pascal, or low-level assembler languages.

It will be appreciated that computer system 600 is illustrative and that variations and modifications are possible. Computer systems can be implemented in a variety of form factors, including server systems, desktop systems, laptop systems, tablets, smart phones or personal digital assistants, wearable devices, e.g., goggles, head mounted displays (HMDs), wrist computers, and so on. A particular implementation can include other functionality not described herein, e.g., wired and/or wireless network interfaces, media playing and/or recording capability, etc. In some implementations, one or more cameras can be built into the computer or other device into which the sensor is imbedded rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

While computer system 600 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

Figure 7A:
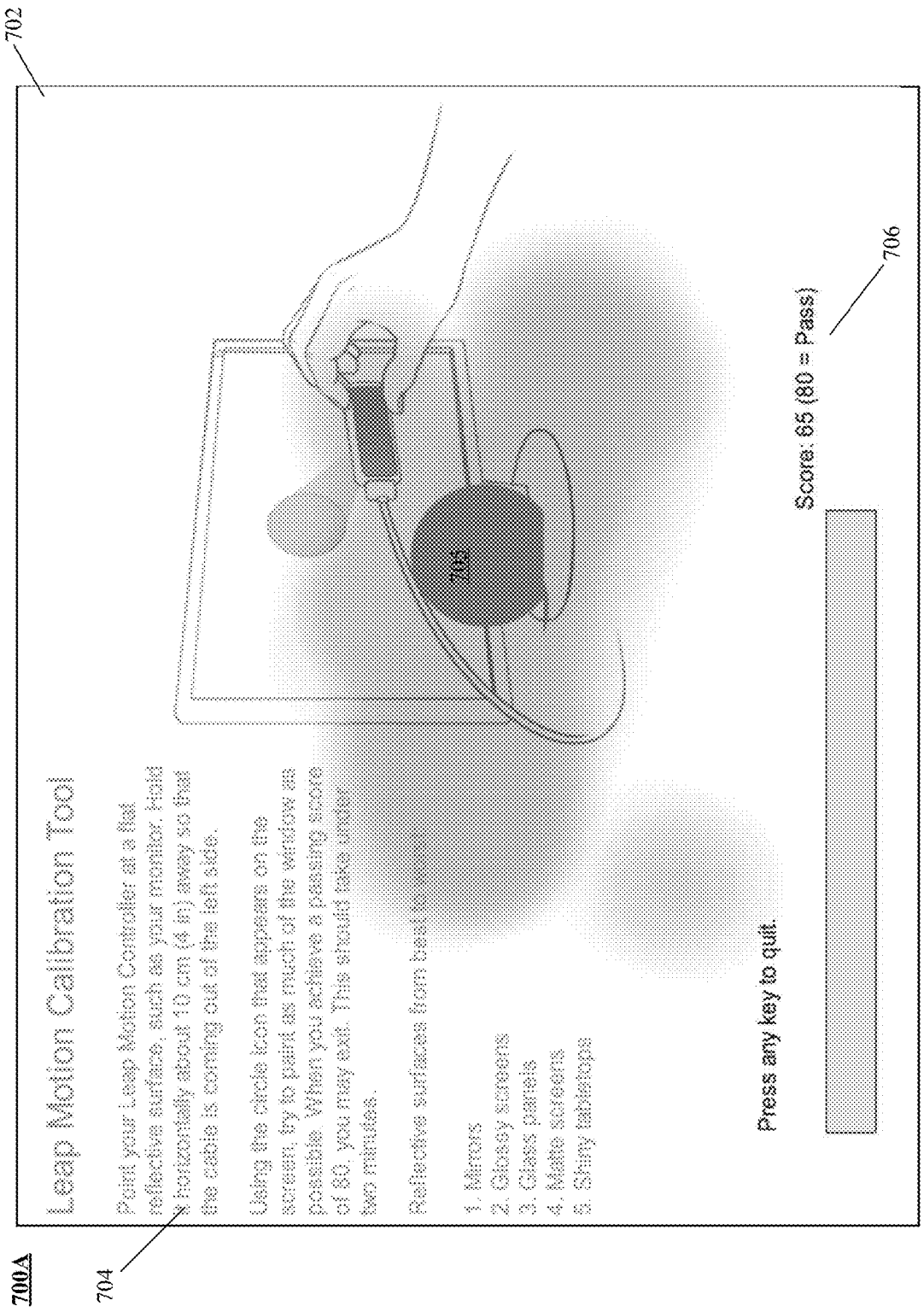
FIGS. 7A-7B depict a user screen for a calibration procedure in accordance with various implementations.
Figure 7B:
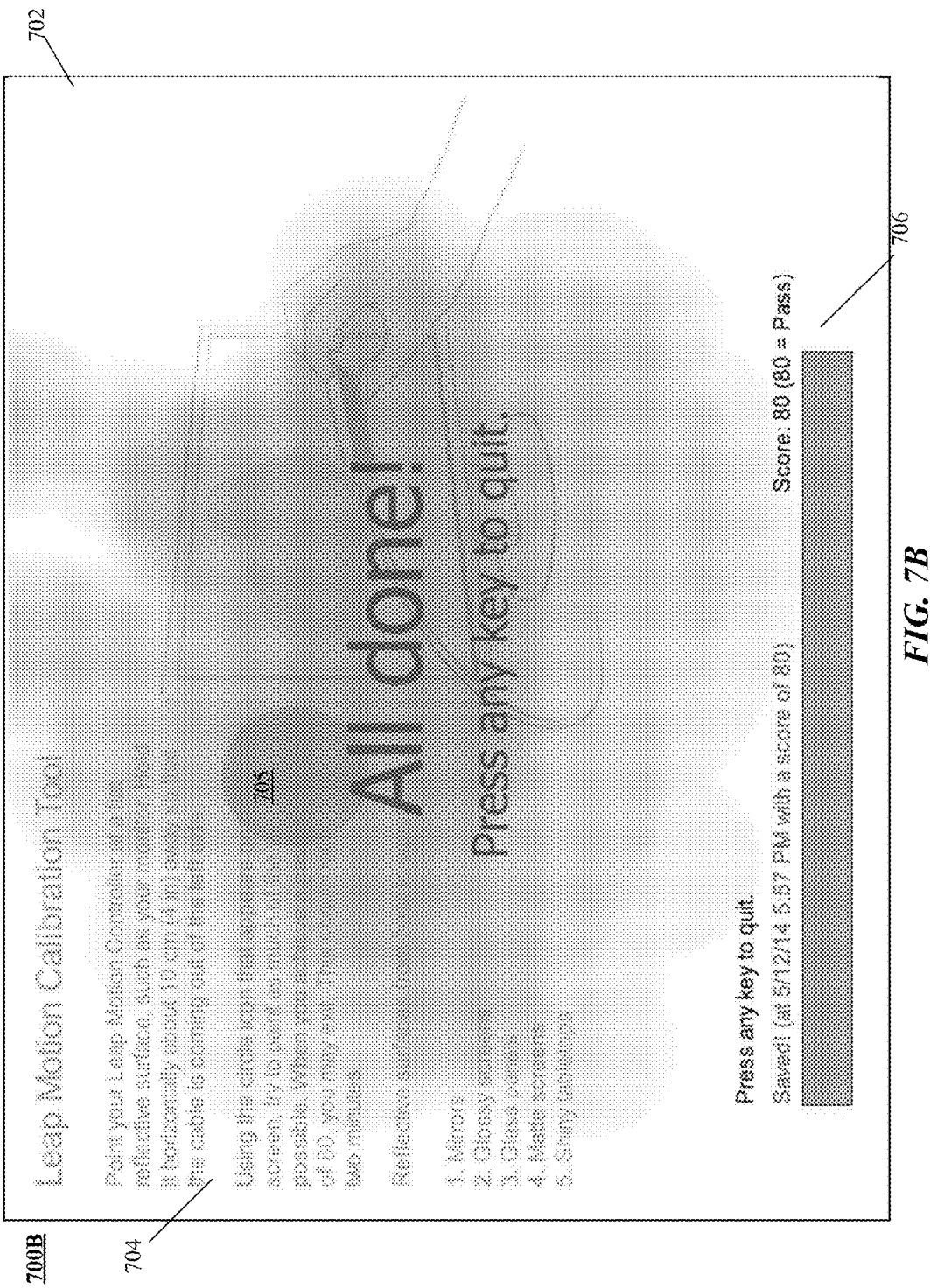

FIGS. 7A and 7B depict example user screens 700 for a calibration procedure in accordance with various implementations. In particular, calibration module 624 can cause a control panel 702 to be rendered on the screen 700A. The control panel 702 shows a prompt to the user to point the device at a flat reflective surface such as the computer monitor and to hold the device horizontally about 10 cm away from the screen in a position such that the cable emanates from the left side of the device. (See 704). A target icon 705 (in this case a blue circle) is displayed on the control panel 702 and the user is instructed to try to "paint" as much of the screen as possible using the target icon 705 by moving the device around in front of the screen. As the user moves the device around in front of the screen 700, calibration module 624 determines the apparent positions of the illumination sources in the device obtained from the device's reflections. Bisecting planes and normal vectors are determined for the apparent positions and the positions of the illumination sources, and an error is determined for the set of bisecting planes and normal vectors determined for each position. A set of calibration data defining characteristics of the actual positions of the illumination sources in the device is determined for when the error is at a smallest value. A score 706 can be computed from the errors (e.g., a variance value or the like). The score 706 and can be compared to a threshold, or some other acceptance criteria, to determine when a calibration is acceptable. In the example screen 700A illustrated by FIG. 7A, the calibration parameters computed from the user's moving the device in front of the screen have a variance that has yielded a score of 65. Since the desired passing score 706 has been set at 80, the user can re-run the calibration procedure, as illustrated by FIG. 7B. In FIG. 7B, screen 700B again includes a panel 702, instructions 704, target icon 705 and score 706. The resulting reconstruction of illumination sources using new calibration parameters has yielded a score of 80. In this instance, the user's calibration has met the passing score. Of course, the user interface illustrated by FIGS. 7A and 7B is merely one illustrative example of the many types of interfaces that can be created to guide users through calibration.

In some implementations, a history is kept of calibration scores, so that the user can be challenged to exceed previous scores—in addition to or instead of meeting a threshold passing score—in order to provide a "gamification" aspect to calibration. Historical information can be kept on the user's system, the device being calibrated or both. Further, some installations can elect to keep historical information for different machines on a network in a central repository, enabling comparison of scores among different users. Monitoring processes can be applied to the historical information to locate trends, correlations among device calibration results and external factors (e.g., lighting changes, times of day, seasons of the year, etc.) or internal factors (e.g., users, machine types, operating system versions, etc.). Yet further, some installations can place the historical information in a computing cloud, enabling access to the historical information from remote locations outside of the installation's network. In some installations, a prize or premium can be awarded to users performing higher scoring calibrations. Users can be identified automatically from historical information kept by the installation.

It should be stressed that, although the process of calibration has been discussed with respect to moving the device under calibration in front of a monitor, the approach is applicable to many types of reflective surfaces used for such purposes. For example, if the calibration module 624 is implemented as part of a specific application (such as a game or controller logic for a television), the display screen of the television monitor can be used.

Reference may be had to the following sources, incorporated herein by reference, for further information regarding computational techniques:
1. Wikipedia, at http://en.wikipedia.org/wiki/Nelder-Mead_method, on Jan. 20, 2014, 12:48 UTC;
2. Wikipedia, at http://en.wikipedia.org/wiki/Gradient_descent, on Jan. 7, 2014, 14:39 UTC; and
3. Wikipedia, at http://en.wikipedia.org/wiki/Quasi-Newton_method, on Mar. 25, 2014, 11:35 UTC.

Certain implementations of the technology disclosed are described above. It is, however, expressly noted that the technology disclosed is not limited to those implementations. Rather, variations, additions, modifications, and other implementations of what is described herein, as will occur to those of ordinary skill in the art, are deemed within the spirit and scope of the disclosed technology. For example, misalignments between the two cameras can be determined from pairs of images taken with both cameras at the same time, based on a comparison of the two images of each pair. Moreover, it is to be understood that the features of the various implementations described herein are not mutually exclusive and can exist in various combinations and permutations, even if such combinations or permutations are not made express herein, without departing from the spirit and scope of the disclosed technology. Accordingly, the scope of the disclosed technology is not intended to be limited by the preceding illustrative description.

What is claimed is:

1. A method of calibrating an imaging device, the imaging device including a plurality of cameras, the method including:
 capturing reflection images of the imaging device using at least two of the plurality of cameras;
 analyzing the reflection images to (i) locate at least one feature of the imaging device wherein the at least one feature is located in the reflection images and (ii) compute an error based upon a deviation of an expected location of the at least one feature from an observed location of the at least one feature, using a current calibration parameter set; and
 determining an improved current calibration parameter set for the imaging device based at least in part on the error computed from the deviation between an expected location of the at least one feature and an observed location of the at least one feature.

2. The method of claim 1, wherein the capturing includes capturing reflection images of the imaging device including at least one light source, and wherein the at least one feature of the imaging device is located in the reflection images and corresponds to the at least one light source.

3. The method of claim 1, wherein the analyzing includes:
 reconstructing a set of three-dimensional (3D) positions for one or more features of the imaging device captured in the reflection images by applying stereo matching techniques.

4. The method of claim 3, wherein the analyzing includes computing the error by finding a low value for a cost function indicative of a deviation of an expected location of the at least one feature from an observed location of the at least one feature.

5. The method of claim 1, wherein the capturing includes capturing reflection images of the imaging device including three light sources positioned substantially along a straight line, and wherein the at least one feature of the imaging device is located in the reflection images and corresponds to the three light sources.

6. The method of claim 5, wherein the analyzing includes:
reconstructing a set of three-dimensional (3D) positions for the reflected light sources of the imaging device captured in the reflection images using the current calibration parameters by applying stereo matching techniques; and
computing the error from the 3D positions of the reflected light sources.

7. The method of claim 6, wherein the computing the error includes:
determining an extent to which the 3D positions are coplanar.

8. The method of claim 7, wherein determining an extent includes:
computing a set of bisecting planes between an origin (actual) location of a light source and an expected location for the reflected light sources as reconstructed;
computing a set of dot products, each of a combination of a normal corresponding to a bisecting plane and a bisecting point, wherein the plane and the point are between the origin location of a particular light source and the expected location for the reflected particular light source;
computing a variance of the set of all dot products; and
providing the variance as the error.

9. The method of claim 8, wherein determining improved current calibration parameter set includes:
finding a calibration parameter set corresponding to a low value of the error.

10. The method of claim 1, wherein the capturing includes capturing reflection images of the imaging device includes capturing reflection images of an imaging device disposed in front of a reflective screen, the reflection images captured from reflections of the device in the reflective screen.

11. The method of claim 1, wherein the capturing includes capturing reflection images at varying orientations of the imaging device relative to a reflecting surface.

12. The method of claim 1, wherein the calibration parameters include an intrinsic parameter corresponding to a physical arrangement of portions of the camera.

13. The method of claim 12, wherein the intrinsic parameter includes at least one of a distance between a lens and a sensor of at least one of the cameras, a translational displacement between a lens and a sensor of at least one of the cameras, a relative rotation between a lens and a sensor of at least one of the cameras, and a parameter describing a curvature of a lens of at least one of the cameras.

14. The method of claim 1, wherein the calibration parameters include an extrinsic parameter corresponding to a physical arrangement of one or more cameras in the device.

15. The method of claim 14, wherein the extrinsic parameter includes at least one of a distance between any two of the cameras, a translational displacement between any two of the cameras, a relative rotation between any two of the cameras, and a position of at least one light source of the imaging device.

16. The method of claim 9, wherein the finding further comprises:
finding a calibration parameter set corresponding to a value of the error less than a threshold.

17. The method of claim 1, further comprising:
computing a score for a user based at least in part upon a set of error values determined from a repetitive execution of calibration;
comparing the score for the user to a set of scores determined for a plurality of users; and
providing to the user an indication of success based at least in part upon a favorable outcome of the comparison.

18. A computer system for calibrating an imaging device including a plurality of cameras, the system including:
an interface to receive reflection images of the imaging device, the reflection images captured using at least two cameras of the plurality of cameras;
a memory to store the reflection images and instructions for execution by a processor; and
a processor to execute the instructions to analyze the reflection images to (i) locate at least one feature of the imaging device wherein the at least one feature is located in the reflection images and (ii) compute an error based upon a deviation of an expected location of the at least one feature from an observed location of the at least one feature, using a current calibration parameter set, and to determine an improved calibration parameter set for the imaging device based on the at least in part on the error computed from the deviation of the expected location of the at least one feature from the observed location of the at least one feature.

19. The system of claim 18, further including a mirror with a screen having a reflective surface.

20. The system of claim 18 further configured to reconstruct a set of three-dimensional (3D) positions for one or more features of the imaging device captured in the reflection images by applying stereo matching techniques.

* * * * *